United States Patent [19]
Klaassen

[11] Patent Number: 5,226,850
[45] Date of Patent: Jul. 13, 1993

[54] METHOD AND DEVICE FOR DEBONING HALVES OF SLAUGHTERED ANIMALS

[75] Inventor: Lambertus G. M. Klaassen, Rosmalen, Netherlands

[73] Assignee: Stork Protecon B.V., Oss, Netherlands

[21] Appl. No.: 844,713

[22] Filed: Mar. 2, 1992

[30] Foreign Application Priority Data

Mar. 6, 1991 [NL] Netherlands .................. 9100400
Nov. 25, 1991 [NL] Netherlands .................. 9101975
Jan. 21, 1992 [NL] Netherlands .................. 9200111

[51] Int. Cl.[5] .............................................. A22C 17/04
[52] U.S. Cl. .................................... 452/171; 452/135
[58] Field of Search ............................ 452/135, 171

[56] References Cited

U.S. PATENT DOCUMENTS

| Re. 28,508 | 8/1975 | Neebel et al. ............... | 452/171 |
| 3,553,766 | 1/1971 | Herubel ....................... | 452/135 |
| 4,009,652 | 3/1977 | Anderson ..................... | 452/165 |
| 4,134,181 | 1/1979 | Schneider, Jr. .............. | 452/135 |
| 5,023,975 | 6/1991 | Van der Hoorn et al. ..... | 452/135 |

FOREIGN PATENT DOCUMENTS

2709615 11/1977 Fed. Rep. of Germany .
1517853 12/1968 France .
1570426 6/1969 France .
2227826 11/1974 France .
1-312962 12/1989 Japan .
592417 10/1977 Switzerland .

*Primary Examiner*—Willis Little
*Attorney, Agent, or Firm*—Webb, Burden, Ziesenheim & Webb

[57] ABSTRACT

A method for deboning halves of slaughtered animals such as pork, lamb or beef halves wherein the animal is halved beforehand along the central longitudinal plane through the spine, wherein the half is set down onto a supporting surface and
  a) fixedly holding the spine in straightened position,
  b) arranging a cut at a predetermined first angle through the spine ends of the ribs according to a line parallel to the spine,
  c) rotating the group of ribs with adhering meat and the straightened spine relative to each other,
  d) and arranging at least one subsequent cut along the spine at the same or in each case another angle in order to remove the spine.

27 Claims, 10 Drawing Sheets

METHOD AND DEVICE FOR DEBONING HALVES OF SLAUGHTERED ANIMALS

The invention relates to a method for deboning halves of slaughtered animals such as pork, lamb or beef halves wherein the animal is halved beforehand along the central longitudinal plane through the spine.

Removal of the spine from halves of slaughtered animals is to this day a very labour-intensive operation, wherein not only a large number of personnel is required but also skilled personnel. The half is usually further deboned, that is, the ribs are removed. This work demands many additional skilled operations and does not lend itself to mechanical processing of the halves for deboning.

The invention has for its object to provide a method with which the above stated drawbacks are obviated.

The method according to the invention is distinguished by the following steps of:

a) fixedly holding the spine in straightened position, b) arranging a cut at a predetermined first angle through the spine ends of the ribs according to a continuous or staggered line parallel or virtually parallel to the spine, c) rotating the group of ribs with adhering meat and the straightened spine relative to each other, d) and arranging at least one subsequent cut along the spine at the same or in each case another angle in order to remove the spine.

A very great labour saving is possible with the proposed method because all steps can be performed mechanically. The half is no longer divided but remains a single entity, which is advantageous for the customer, who can himself then determine how to process it further, which varies according to country and culture. By changing the angle of the subsequent cuts little meat remains behind on the spine for removal.

According to a further development of the invention the method is distinguished in that the subsequent cut is arranged at a predetermined second angle along the spine through the end portions of the vertebrae of the spine and those end portions of the vertebrae are then removed from the half with the ribs.

The half with wholly or partially released spine can subsequently be subjected to application in each case of a transverse force on the spine end of the rib and displacing of this transverse force in order to remove the rib from the meat.

The invention further relates to a device for performing the above stated method.

The invention is further elucidated with reference to the figure description hereinbelow of an embodiment of the invention. In the drawing.

Figure 1:
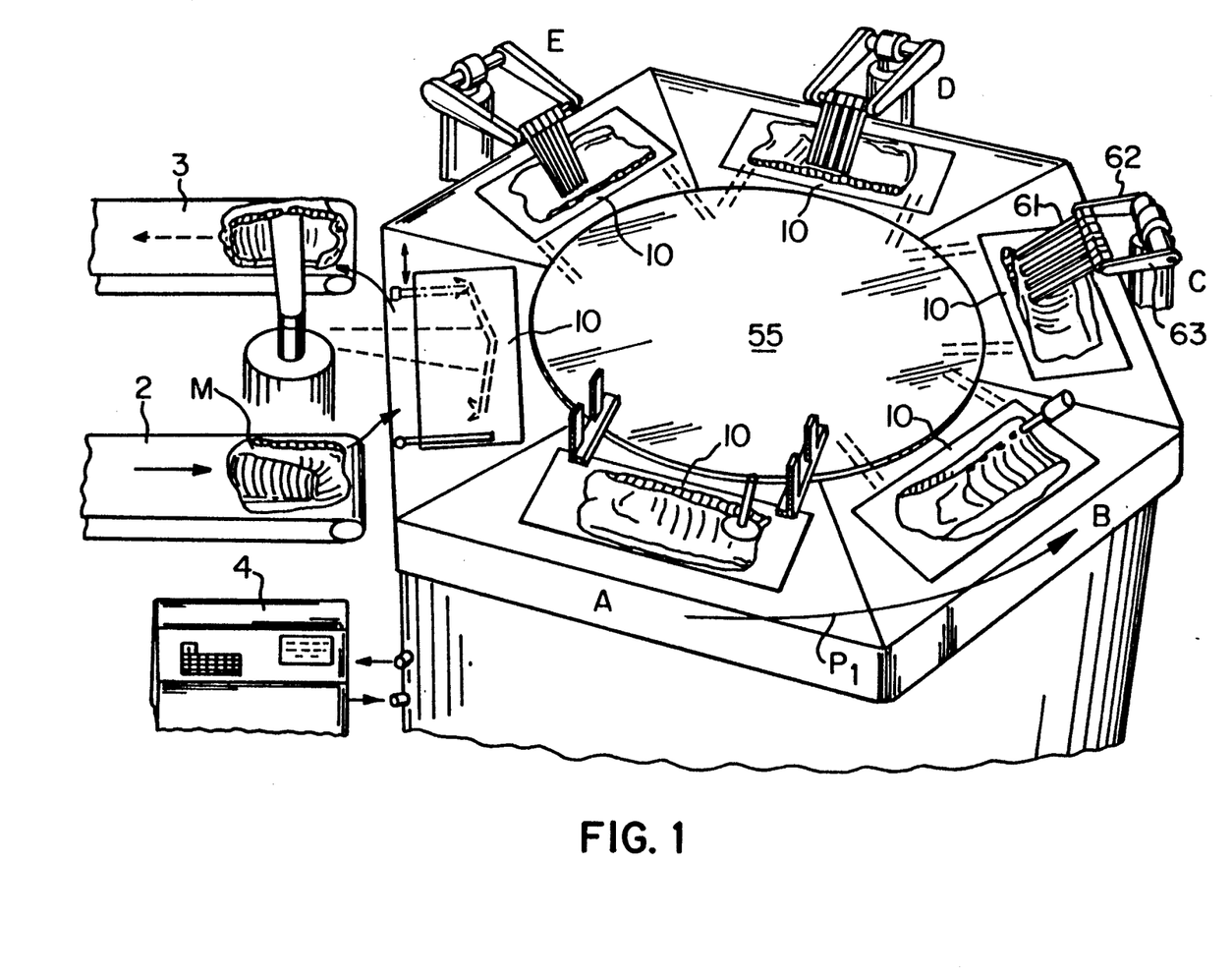
FIG. 1 shows a perspective top view of a rotary table with different processing stations for performing the method according to the invention.

The possible device shown in FIG. 1 by way of example for performing the above stated method consists of a hexagonal table 1 which can rotate in the direction of the arrow P1, wherein the means for the rotation and the bearing mounting respectively is not further shown. This is deemed to be generally known. Arranged around the table along each side are fixed stations which are further elucidated hereinafter and which serve to successively perform the steps of the method for deboning the half. Shown on the left is a feed conveyor 2 in the form of an endless conveyor belt on which the halves M are supplied. Lying parallel therebehind is a discharge conveyor 3 for carrying away the deboned half on each occasion. Finally, a control cabinet 4 is shown at the bottom in FIG. 1 with which the operation of the diverse appliances at the different stations as well as the stepwise rotation of the table 1 can be controlled.

Figure 2:
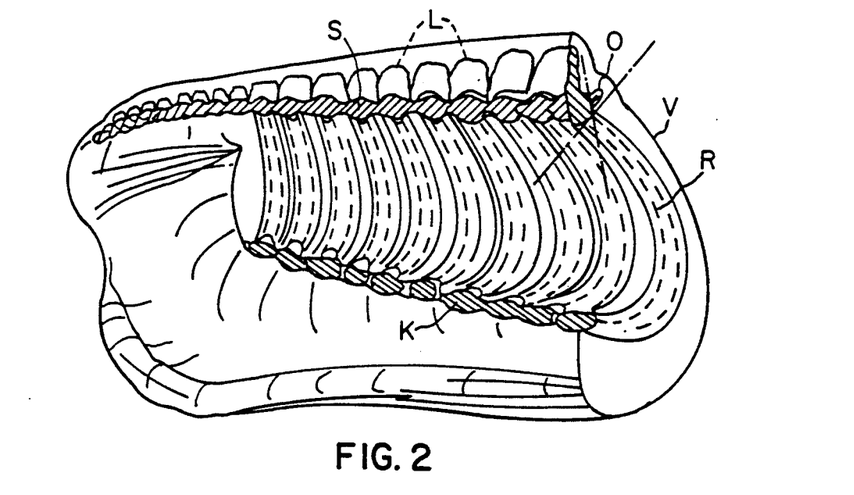
FIG. 2 is a view of a half of a slaughtered animal.

The half that has to be deboned is shown in FIG. 2 which shows that the spine S has been halved, to which spine the ribs are attached and have a particular shape depending on the type of animal, wherein it may be noted that the end of the ribs R remote from the spine S end in the cartilage K. On the upper part of the spine S is the backbone extension L. The drawing shows the inside of the half so that the meat V is located on the outside of the ribs, the spine and the backbone extension. Using the method according to the invention it is possible to separate the meat from the ribs respectively the spine in mechanical manner, wherein the meat is scarcely damaged and is left as one whole.

For mechanical handling of the half the invention proposes the use of a holding member in the form of a clamping bench with which the spine and the backbone extension can be fixedly clamped according to a virtually straight line.

Figure 3:
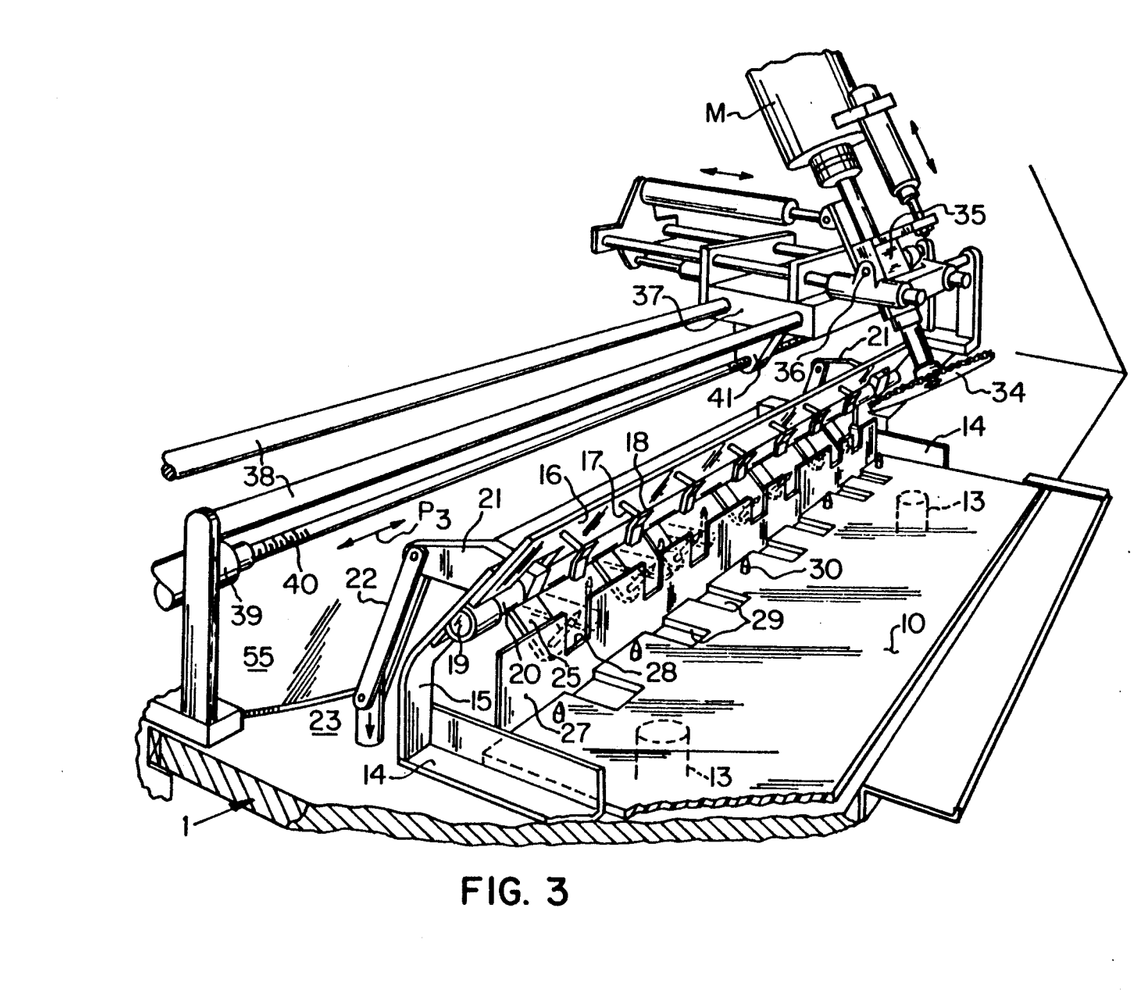
FIG. 3 is a perspective view of the cutting station of the device of FIG. 1.
Figure 4:
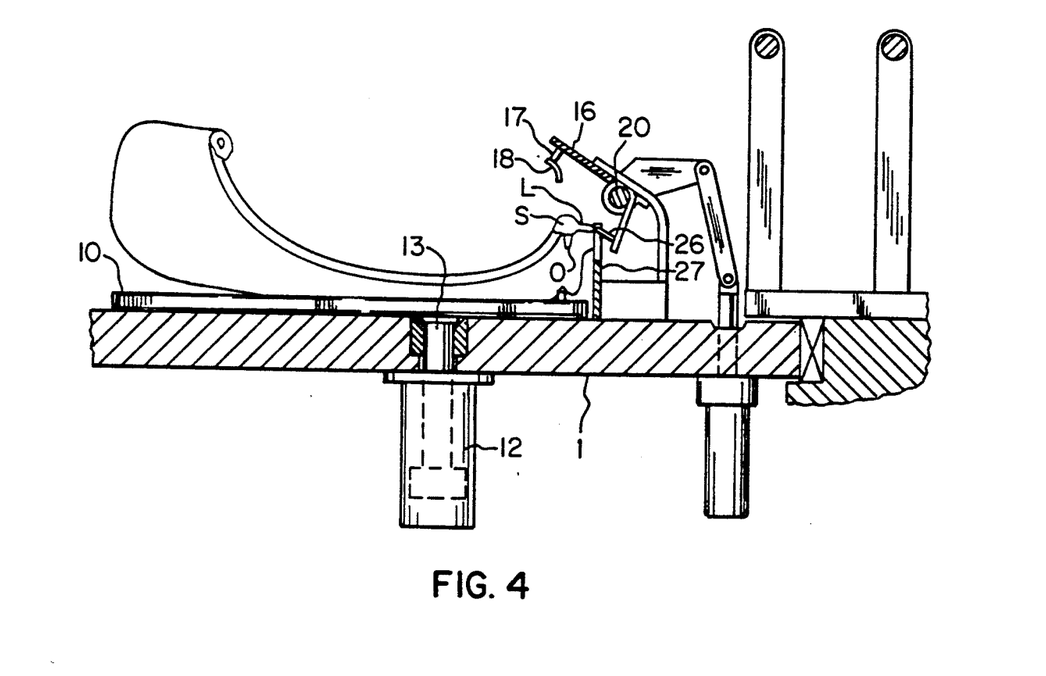
FIG. 4 is a front view of a part of the cutting station of FIG. 3.
Figure 5:
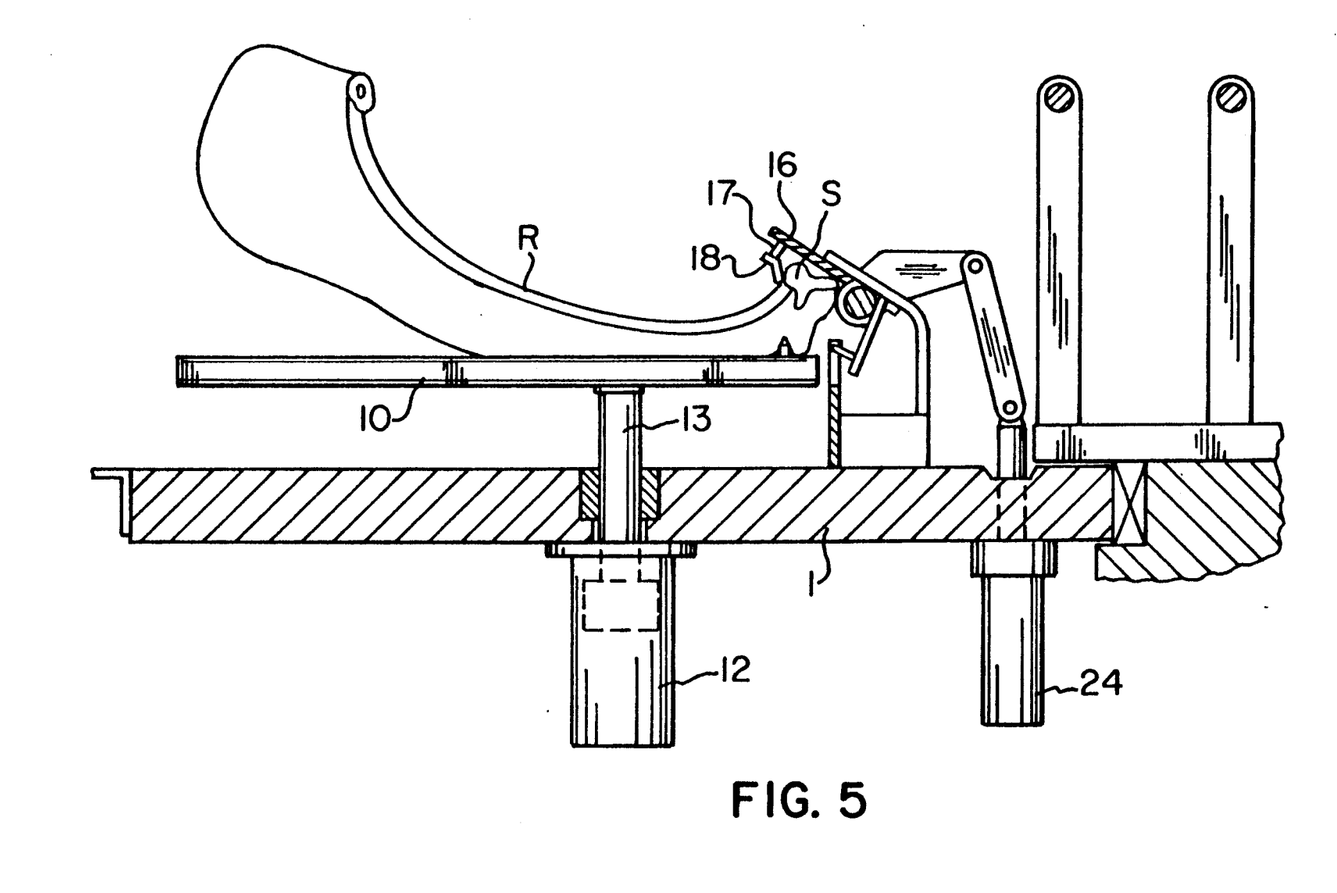
FIG. 5 is a view corresponding with FIG. 4 of the same part of the cutting station in a different position.

The clamping bench shown in FIG. 3 consists of a support plate 10 which is up and downwardly movable in vertical sense relative to table 1 by means of a cylinder 12 arranged on the underside of table 1 and whereof the piston rod 13 is connected to the underside of the plate 10, see also FIG. 4 and 5. Plate 10 can have a shape corresponding more or less with the portion of the half laid thereon. The clamping bench may also comprise a row of parallel support strips, each placed above table 1 up and downwardly movable on a cylinder, which row can uniformly support the lengthwise contour of each half. On either side of the support plate 10 is arranged in each case a guide support 14 which is also provided on the side remote from the support table 10 with a standing bracket 15 which supports a strip 16 at a distance above the support table 10, on which strip is arranged a series of stops consisting of pins 17 lying perpendicular to the strip 16 and provided with lips 18 arranged on the free end thereof. The lips 18 take a slightly folded form in side view such that the underside in FIG. 3 faces away from the strip 16. The brackets 15 also serve to fixedly hold a bearing 19 in which the ends of a rod 20 are rotatably received. The rod 20 is provided with an arm 21 located on the rear of the strip 16 and on the free end of which a piston rod 23 of a cylinder 24 is connected to the underside of table 1 via a coupling rod 22.

Fixed on the side of the rod 20 remote from the arm 21 is a number of lip-shaped strips 25 which are arranged such that they are located opposite the lips 18 of the stops on strip 16. Each lip 25 is provided with a pin 26. Arranged on the rear side of the support table 10 and virtually under the strip 16 is a stop plate 27 which is provided on the top with recesses 28 lying directly opposite the lip-shaped strips 25 such that when the rod 20 is turned by means of cylinder 24 the lips 25 can move through these recesses 28 and the pins 26 can be moved toward and away from the lips 18.

It is remarked that the support table 10 also has recesses 29 on the side of the plate 27, wherein upward pointing pins 30 are arranged between the recesses.

Figure 6:
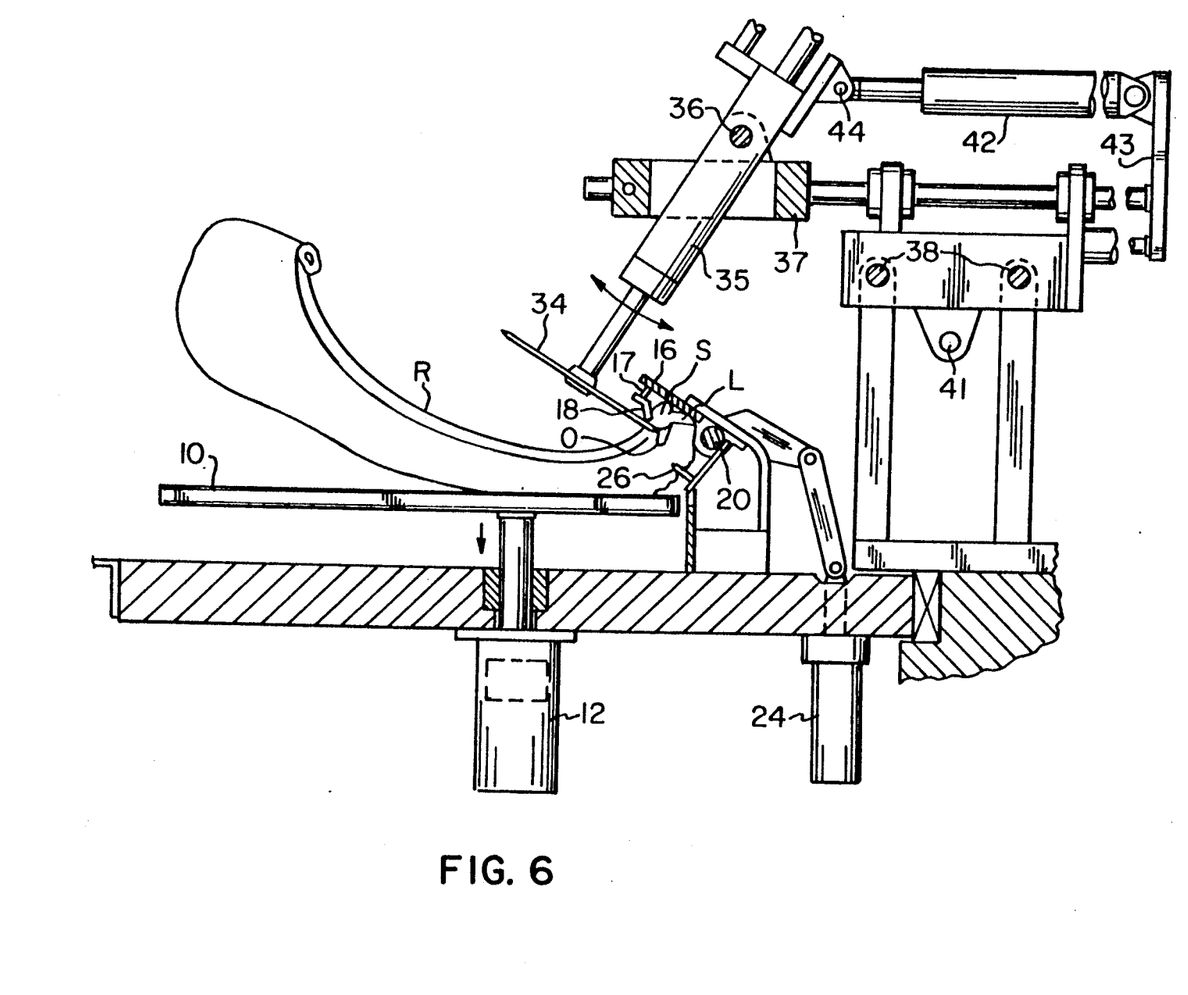
FIG. 6 is a view corresponding with FIG. 4 and 5 of the cutting station in which the first cut is applied.

The operation of the clamping bench according to FIG. 3 is further elucidated with reference to this figure and FIG. 4, 5 and 6.

Assuming the position in FIG. 4, it is noted that the support table 10 lies on table 1 and that the row of pins 26 is situated in the downward oriented position, that is, behind the wall plate 27. By laying a half with the spine side S facing in the direction of the standing wall plate 27 the half can be set down with the outer side, that is, the meat side thereof, on plate 10, wherein the spine side is pressed manually as far as possible onto the pins 30 of support table 10.

By energizing cylinder 12, see FIG. 5, the spine S is pushed under the diverging lips 18 and pressed against the plate 16. This movement results in the ribs R assuming a rotated position relative to FIG. 4, wherein the free end is raised from the plate 10.

By energizing the cylinder 24, see FIG. 6, the rod 20 is rotated clockwise whereby the pins 26 are pressed from below into the meat and under the spine S.

In this manner the spine S is clamped fixedly in a virtually straight line into the clamp bench according to FIG. 3.

At station A in FIG. 1 the first cut A respectively the second cut B according to the invention is carried out along a straight line parallel to the spine S (see FIG. 2).

Serving for this purpose is a cutting station as according to FIG. 6.

This cutting station consists of a saw blade 34 driven by a motor in a holder 35, wherein the holder 35 is suspended in a carriage 37 for pivoting about a point 36. The carriage 37 is reciprocally movable in a direction along the strip plate 16 along a parallel guide in the form of two rods 38. The driving of the carriage 37 takes place by means of a cylinder 39 whereof the cylinder rod 40 engages onto an eye 41 of carriage 37, see also FIG. 3. Swivelling of the holder 35 about the point 36 is carried out by a cylinder 42 which supports on one side on a bracket 43 of carriage 37 and the piston rod of which engages onto the holder 35 via the pivot joint 44.

Figure 7:
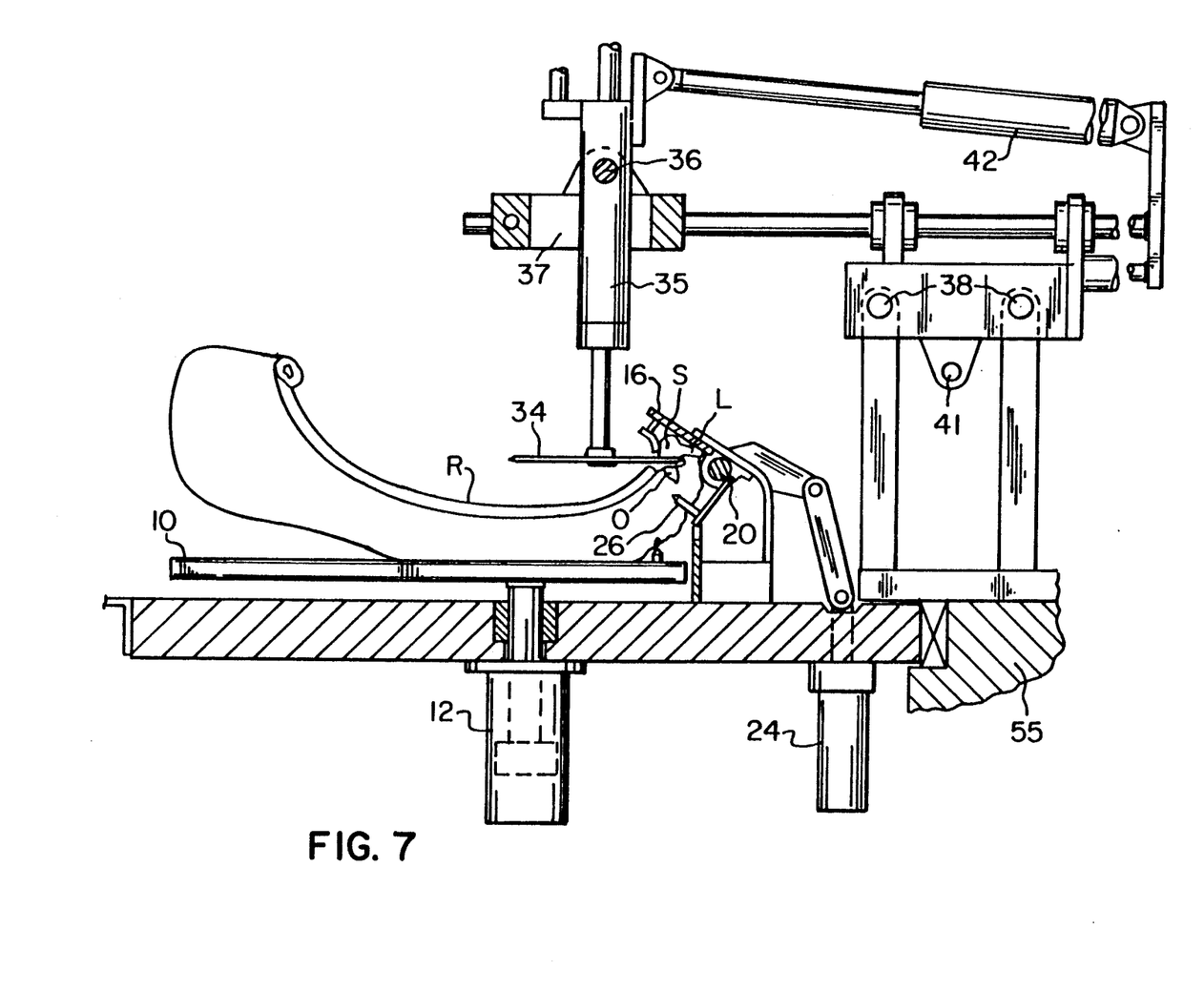
FIG. 7 is a view corresponding with FIG. 6 of the cutting station in which the second cut is applied.

The above described cutting station operates as follows. By energizing the motor M the saw blade 34 is set into rotation round the spindle and through a correct adjusting of cylinder 42 the angle of the saw blade 34 can be set relative to the plate 10. By energizing the cylinder 39, the carriage and therewith the saw blade 34 are carried along the strip plate 16 in the direction of arrow P3 and a cut is therefore arranged through the spine ends of each rib R, see FIG. 6, which cut extends parallel or virtually parallel to the spine S. The cut has a substantially continuous path. At the transition between the ribs on the shoulder side and the smaller, flat ribs on the ham side of the half a rather abrupt jump of 3–4 mm may be desirable. The saw blade 34 is shifted axially for this purpose. By lowering the support table 10, which can take place at this moment or beforehand by releasing the cylinder 12, an opening will occur at the spine ends of the ribs R due to the weight of the half, see FIG. 7. Correct height adjustment of the saw blade 34 also determines that the cut takes place as closely as possible to the vertebrae of the spine. A second cut can subsequently be arranged in the above described manner, wherein however the angular position of saw blade 34 is changed by energizing the cylinder 42. The saw blade 34 can herein cut through the portion of the vertebrae, wherein a vertebrae end is sawn through, which becomes visible in the cutting surface of the meat as so-called eyes of meat.

After these two cuts along the spine S the latter is almost completely separated from the half with the exception of a piece of meat remnant along the backbone extension L, along which the meat can however be separated by a simple shearing movement.

Owing to the position of the cuts as close as possible along the spine S, as much meat as possible is retained in the half and as little as possible left behind on the spine.

Figure 8:
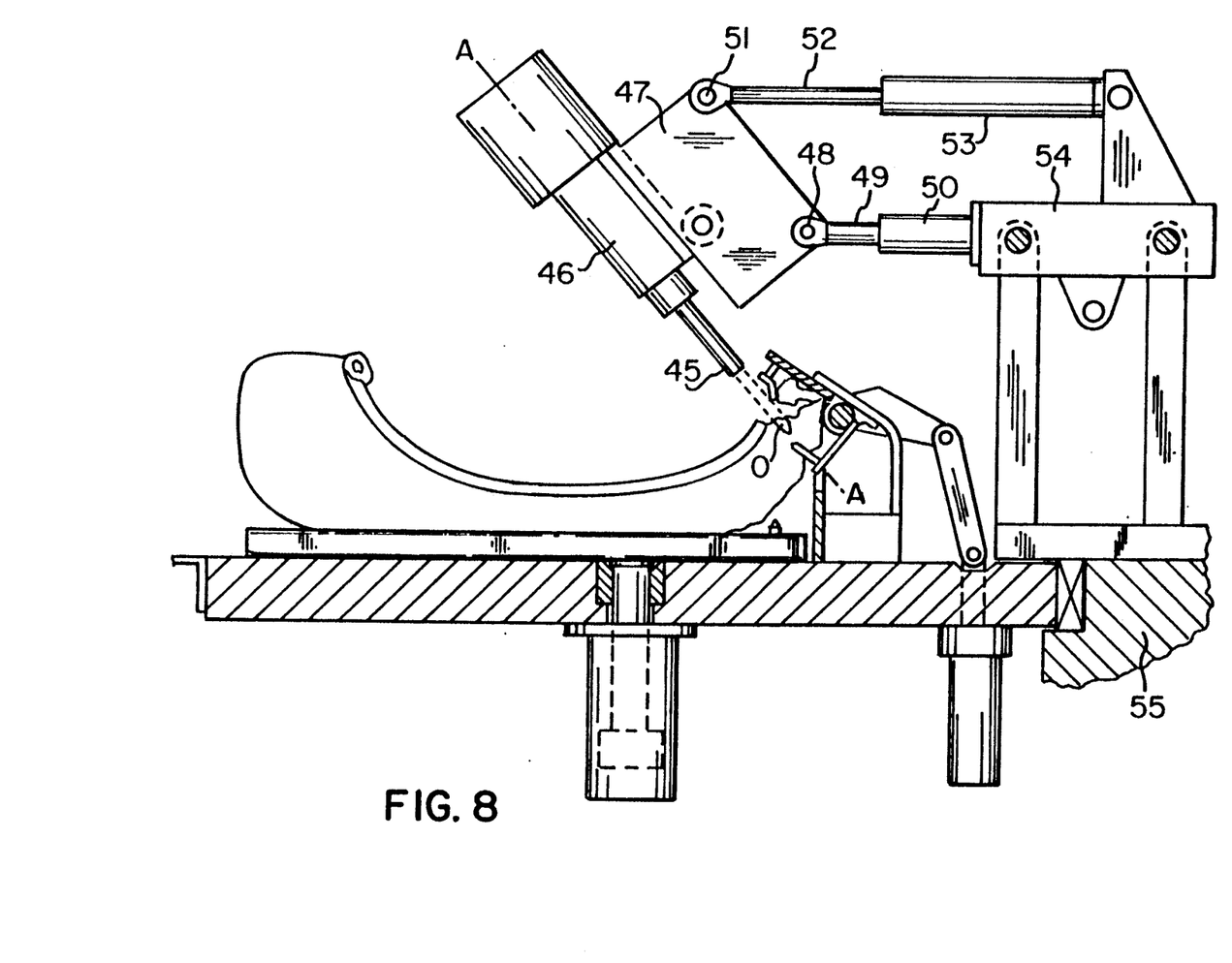
FIG. 8 is a view corresponding with FIG. 6 and 7 of the station for removing the vertebrae end portions or eyes of meat.

When table 1 is turned further the thus processed half arrives at station B where the meat eyes 0 can be removed by means of a hollow drill 45, see FIG. 8. The hollow drill 45 is received in a bit brace 46 which is fixed on a support 47 which is pivotally connected at 48 to a piston rod 49 of a cylinder 50. The support 47 is also connected at 51 to a piston rod 52 of a cylinder 53. The cylinders are supported by a holder 54 which is supported on a frame plate 55 along the outer periphery of table 1.

The hollow drill 45 is oriented along the drilling axis A—A by means of cylinders 50, 53 such that when the hollow drill 45 is displaced along the drilling axis A—A an eye of meat can be enclosed each time by the end of the hollow drill 45 and subsequently removed by retracting hollow drill 45.

With further rotation of table 1 in the direction of arrow P1 the thus processed half arrives at the stations C, D and E for removing the ribs.

The means for removing the ribs can consist of a flexible cutting blade 60 that is moved reciprocally in a cutting blade holder 61. This cutting blade holder 61 with cutting blade 60 received therein is described inter alia in the Netherlands patent application 9001746 of applicant. One or a number of cutting blade holders 61 can be fixed in a common carrier 62 which is fixed to an arm 63 for pivoting according to arrow P4. The arm 63 is supported for pivoting according to arrow P5 by a column 64 which is disposed along the outside of table 1. Each station C, D and E is embodied in the same manner and serves to simultaneously remove ribs, the number of which depends on the number of cutting blade holders 61 with cutting blades 60.

Figure 10:
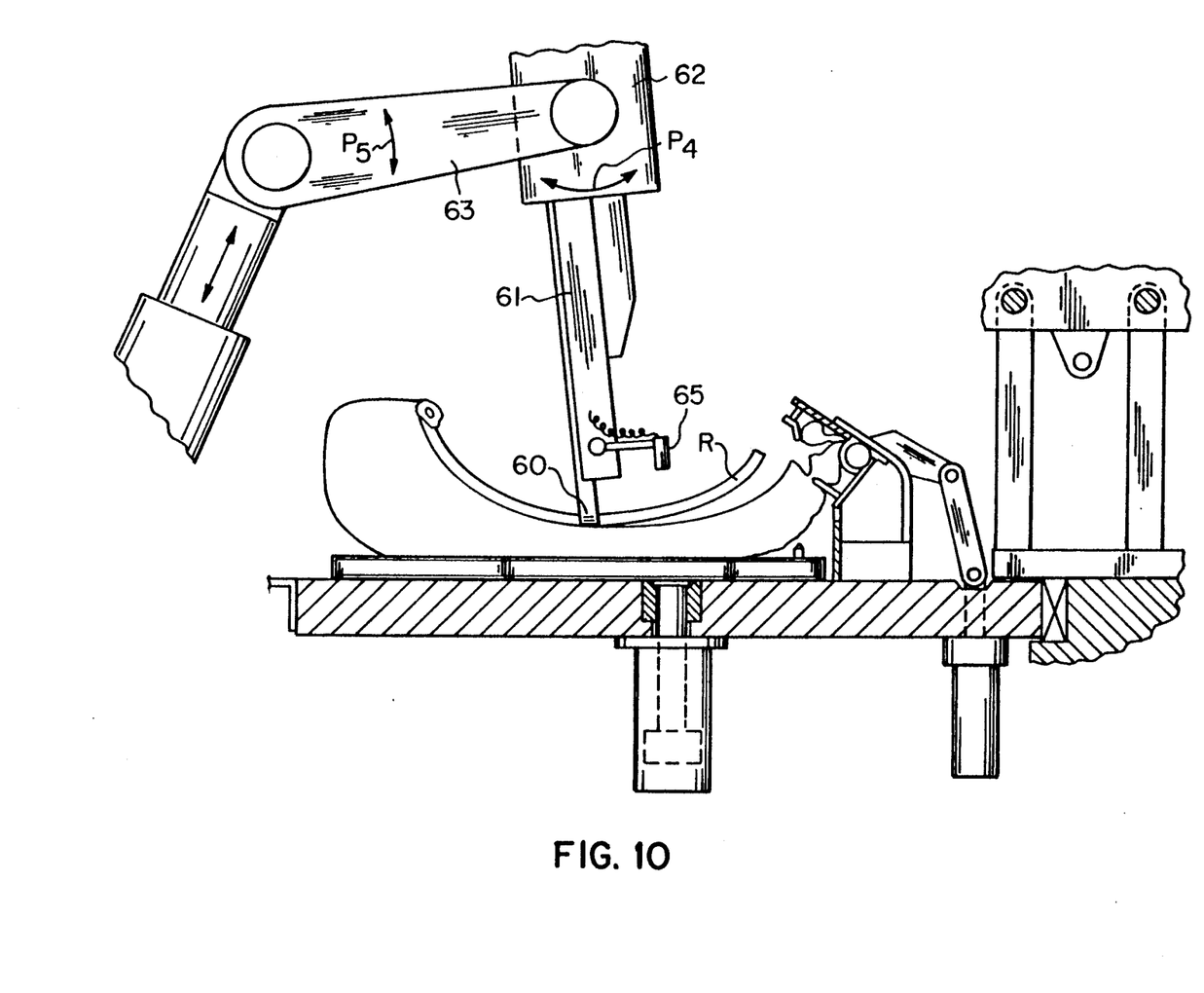

The cutting blade holder 61 is embodied with a sensor 65 which detects the bone in the half and in particular the cutting surface obtained through the first cut by cutting blade 34. Around this cut off end of the rib R is arranged the loop of cutting blade 60 which is then carried along the underside of the rib R in the direction of the cartilage K, see inter alia FIG. 10. By exerting a tensile force on the rib it is raised out of the half, wherein due to the loop-like cutting knife as little meat as possible remains behind on the rib.

The meat can subsequently be sheared from the backbone extension L and after station E the half is deboned and at station F, using suitable gripping means 70, can be laid onto the discharge conveyor 3. By reversing the cylinder 24 the spine S with the backbone extension L is released and can likewise be removed. The clamp bench is thus ready for receiving a following half and the above described method can be repeated.

Figure 11:
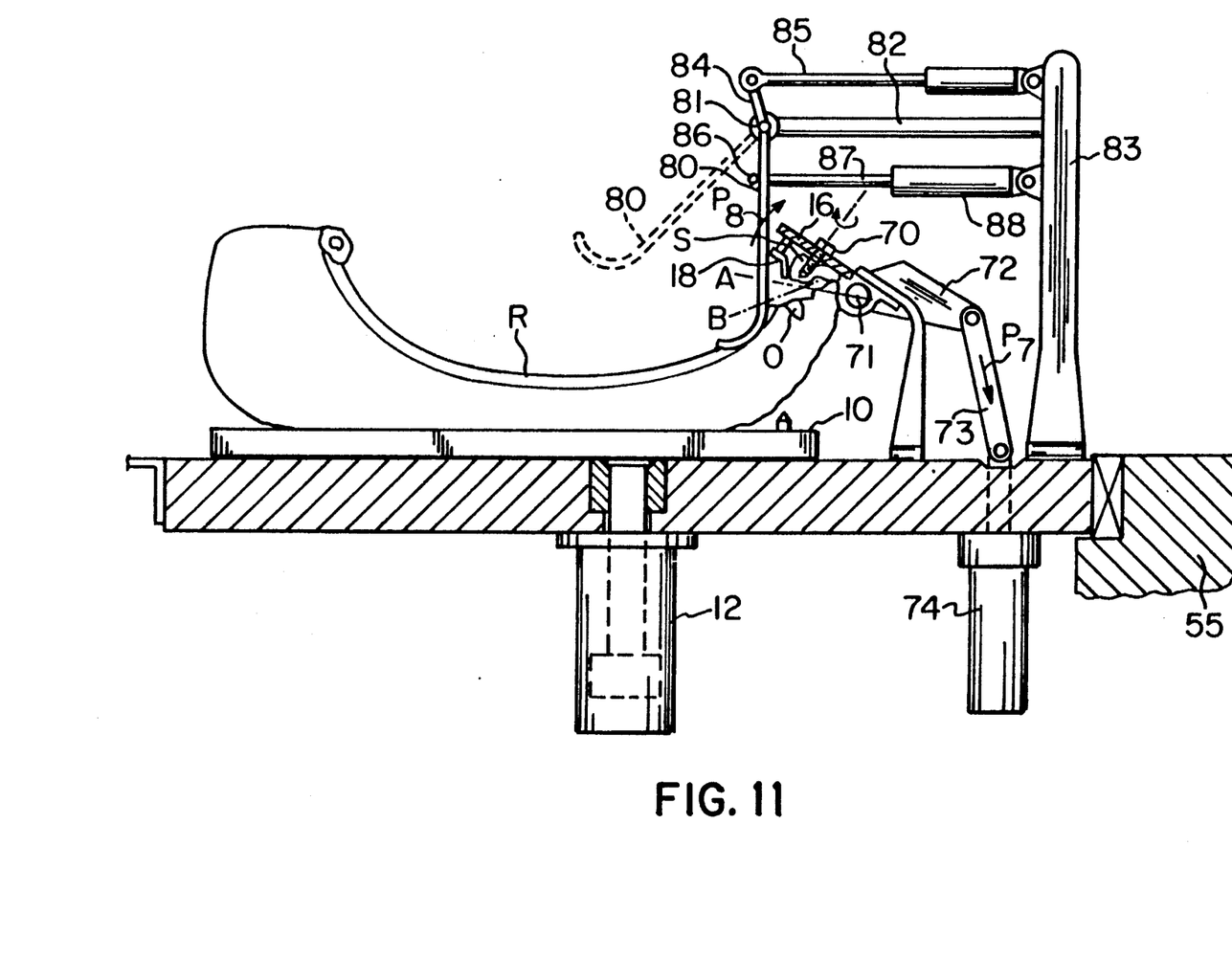
FIG. 11 is a front view corresponding with FIG. 4 of an alternative manner of fixing the spine and auxiliary member for the group of ribs of the half.

Shown in FIG. 11 is an alternative embodiment with which the spine S can be held fixedly against the strip 16. For this purpose the half is laid on the support table 10 which can be moved upward by the cylinder 12 arranged thereunder. The strip plate 16 is provided with two or more through-holes, through which screws or bolts 70 can be inserted. The spine S can be held fixedly against the underside of the strip plate 16 by screwing the screws 70 therein.

It is noted that the strip plate 16 is now pivotable about a shaft 71 which is provided with an arm 72 connected via a coupling piece 73 to the piston rod of the cylinder 74. By energizing the cylinder such that the coupling piece moves downward in the direction of arrow P7 the strip plate 16 is pivoted upward clockwise about the shaft 71, see arrow P8. After arranging of the first cut under the line A—A a spreading can hereby be effected of the spine and the group of ribs R of the half resting on table 1.

It is noted that the strip plate 16 is provided with the stops 18 under which the spine S is pressed fixedly by moving table 10 upward prior to the bolts 70 being rotated into the spine.

The device according to FIG. 11 is further provided with a pressing member in the form of a series of rods located at a mutual distance, the pitch of which corresponds with the pitch of the ribs R in the rib piece. In this way the rods 80 can be pressed between the ribs of the rib piece by means of the driving shown schematically in FIG. 11.

The rake-like pressing member 80 is pivotable about a shaft 81 which is mounted in an arm 82 of the frame 83. The rake-like pressing member 80 is provided with an arm 84, the free end of which is connected to the piston rod of a cylinder 85. By energizing cylinder 85 the rake-like pressing member 80 can thus be carried from the position in dashed lines to the position in full lines so that the curved bottom end of each rod 80 is pressed against the half between the rib ends.

Pressing-on can be improved still further by arranging a pull rod 86 on the outside of the rake-like pressing member 80, which rod is connected to the cylinder rod 87 of cylinder 88. By energizing the cylinder 88 such that the cylinder rod 87 moves inward the pull rod 86 will move all rods 80 of the rake-like pressing member to the right in FIG. 11, whereby the pressure force of the ends of each rod on the rib piece is considerably increased.

Figure 9:
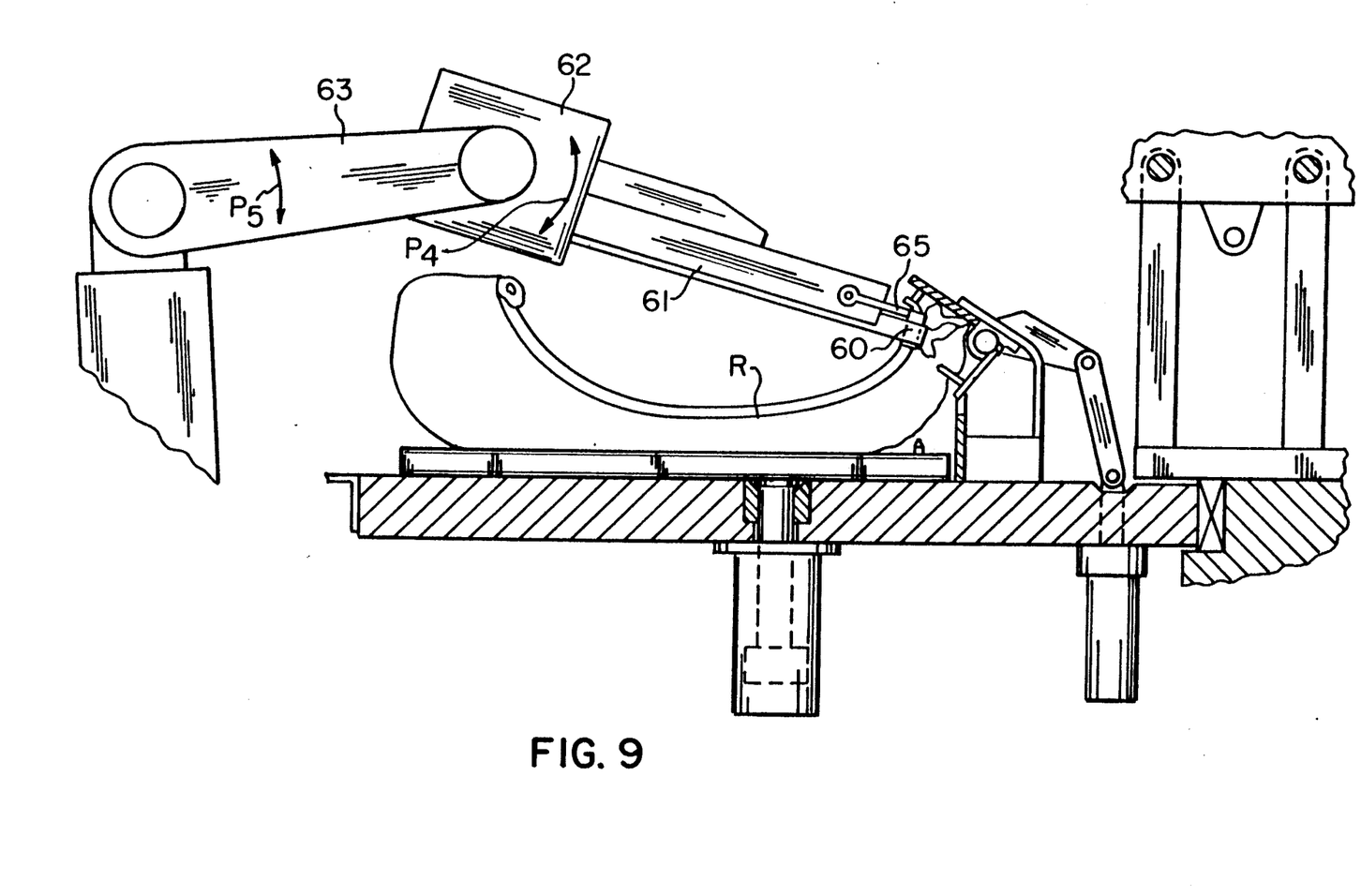
FIG. 9 and 10 show views corresponding with FIG. 6 and 7 of the station for removing ribs in two different positions.

Because the ends press between the ribs R of the rib piece the rib can be more easily removed from the rib piece by means of the system shown as according to FIG. 9.

Depending on the desired degree of deboning it is also possible to suffice with one cut of the cutting blade 34 which can be arranged at a greater distance from the spine S. Removal of the rib can be performed in the described manner but also in other ways without detracting from the manner of arranging a first and, if required, a second cut along the spine as proposed by the invention.

The advantage obtained with the cut is that the ribs for removal are easy to detect and the so-called rib-pulling from the spine end of the rib can be carried out more easily.

I claim:

1. A method for deboning halves of slaughtered animals having spines and ribs wherein the animal is halved beforehand along a central longitudinal plane through the spine, comprising the following steps of:
    a) fixedly holding the spine in a straightened position;
    b) arranging a cut at a predetermined first angle through the spine at ends of the ribs according to a continuous or staggered line approximately parallel to the spine;
    c) rotating a group of ribs with adhering meat relative to the straightened spine; and
    d) arranging at least one subsequent angled cut along the spine in order to remove the spine from the slaughtered animal.

2. A method as claimed in claim 1, wherein the subsequent cut is arranged along the spine through end portions of vertebrae of the spine and then removing the end portions of the vertebrae.

3. A method as claimed in claim 1 further comprising subjecting a transverse force on the spine end of the rib to remove the rib from the meat.

4. A method as claimed in claim 1, wherein the subsequent cut angle varies during the movement along the spine.

5. A device for deboning halves of slaughtered animals with spines and ribs, comprising:
    a supporting table having a supporting surface for supporting a half of a slaughtered animal;
    a holding member located at a distance above the surface for fixedly holding the spine and having a pressing surface, the supporting table attached to the holding member, the holding member formed by a row of stops and a number of stops movable towards and away from these stops and co-acting therewith;
    a cutting member attached to the supporting table; and
    a guide for moving the cutting member reciprocally along the holding member, the guide attached to the supporting table wherein the pressing surface of the holding member extends relative to the supporting surface at a predetermined angle smaller than 90°, wherein the stops are fixed relative to the guide.

6. A device as claimed in claim 5, wherein the angle between the pressing surface and the supporting surface is adjustable.

7. A device as claimed in claim 6, wherein the supporting surface is height-adjustable.

8. A device as claimed in claim 5, wherein the fixed stops are situated relative to the supporting surface above the movable stops.

9. A device as claimed in claim 5, wherein the cutting member is embodied in the form of a rotatably driven saw blade having a rotation axis arranged at an angle varying from 90° relative to the supporting surface.

10. A device as claimed in claim 9, wherein the angle of the rotation axis of the cutting member is tiltable about a pivot having an axis that runs parallel to the supporting surface.

11. A device as claimed in claim 5, wherein the supporting surface is provided with a drilling device for drilling out eyes of meat, wherein the drill axis has an angle to the vertical onto the supporting table opposed to the axis of rotation of the cutting member.

12. A device as claimed in claim 11, wherein the drilling device is equipped with a hollow drill.

13. A device as claimed in claim 12, wherein the drilling device is supported by a holder, wherein the holder is reciprocally movable parallel to the supporting surface along the guide.

14. A device as claimed in claim 13, wherein the drilling device is equipped with a sensor for repeatedly detecting an eye of meat in the half for deboning.

15. A device as claimed in claim 5, wherein the supporting surface is embodied with a cutting member for cutting the ribs out of the half.

16. A device as claimed in claim 15, wherein the cutting member for the ribs is embodied as a loop-shaped cutting knife which is supported in a holder embodied as an articulated arm.

17. A device as claimed in claim 5, wherein the supporting surface is formed by the upper surface of the supporting table.

18. A device as claimed in claim 17, wherein the supporting table consists of two or more parts which are height-adjustable independently of each other.

19. A device as claimed in claim 17, wherein the supporting table is movable according to the guide along a first cutting station for arranging the cuts parallel to the spine, a drilling device for drilling out eyes of meat and a second cutting station for removing the ribs of the slaughtered animal.

20. A device as claimed in claim 17, wherein the supporting table is displaceable along a path and the path for the supporting table is a closed circuit.

21. A device for deboning halves of slaughtered animals having spines and ribs wherein the animal is halved beforehand along a central longitudinal plane through the spine, comprising:
a) means for fixedly holding the spine in a straightened position;
b) means for arranging a cut at a predetermined first angle through the spine at ends of the ribs according to a continuous or staggered line approximately parallel to the spine;
c) means for rotating a group of ribs with adhering meat relative to the straightened spine; and
d) means for arranging at least one subsequent angled cut along the spine in order to remove the spine from the slaughtered animal.

22. A device for deboning halves of slaughtered animals having spines and ribs, comprising:
a supporting table having a supporting surface for supporting a half of a slaughtered animal, the supporting surface including a drilling device having a drill axis for drilling out eyes of meat;
a holding member located at a distance above the surface for fixedly holding the spine and having a pressing surface, the supporting table attached to the holding member;
a cutting member attached to said supporting table wherein the drilling device drill axis has an angle to the vertical onto the supporting table opposed to an axis of rotation of the cutting member; and
a guide for moving the cutting member reciprocally along the holding member, the guide attached to the supporting table wherein the pressing surface of the holding member extends relative to the supporting surface at a predetermined angle smaller than 90°.

23. A device as claimed in claim 22, wherein the drilling device is equipped with a hollow drill.

24. A device as claimed in claim 23, wherein the drilling device is supported by a holder, wherein the holder is reciprocally movable parallel to the supporting surface along the guide.

25. A device as claimed in claim 24, wherein the drilling device is equipped with a sensor for repeatedly detecting an eye of meat in the half for deboning.

26. A device for deboning halves of slaughtered animals with spines and ribs, comprising:
a supporting table having a supporting surface for supporting a half of a slaughtered animal, the upper surface of the supporting table forming the supporting surface;
a holding member located at a distance above the surface for fixedly holding the spine and having a pressing surface, the supporting table attached to the holding member;
a cutting member attached to the supporting table; and
a guide for moving the cutting member reciprocally along the holding member, the guide attached to the supporting table wherein the pressing surface of the holding member extends relative to the supporting surface at a predetermined angle smaller than 90°, wherein the supporting table is movable according to the guide along a first cutting station for arranging the cuts parallel to the spine, a drilling device for drilling out eyes of meat and a second cutting station for removing the ribs of the slaughtered animal.

27. A device for deboning halves of slaughtered animals with spines and ribs, comprising:
a supporting table having a supporting surface for supporting a half of a slaughtered animal, an upper surface of the supporting table forming the supporting surface, wherein the supporting table is displaceable along a path and the path for the supporting table is a closed circuit;
a holding member located at a distance above the supporting surface for fixedly holding the spine and having a pressing surface, the supporting table attached to the holding member;
a cutting member attached to the supporting table; and
a guide for moving the cutting member reciprocally along the holding member, said guide attached to the supporting table wherein the pressing surface of the holding member extends relative to the supporting surface at a predetermined angle smaller than 90°.

* * * * *